United States Patent [19]

Moore et al.

[11] Patent Number: 5,592,245
[45] Date of Patent: Jan. 7, 1997

[54] APPARATUS FOR ENHANCING VISUAL PERCEPTION OF SELECTED OBJECTS IN RECREATIONAL AND SPORTING ACTIVITIES

[76] Inventors: J. Paul Moore, 5500 W. 129th St., Overland Park, Kans. 66209; David V. Kerns, Jr., 6626 Brookmont Ter., Nashville, Tenn. 37205

[21] Appl. No.: 288,449

[22] Filed: Aug. 10, 1994

[51] Int. Cl.⁶ .............................. G02C 7/10; G02B 5/22
[52] U.S. Cl. ........................... 351/163; 351/177; 359/885
[58] Field of Search ..................................... 351/163, 164, 351/165, 177; 359/885

[56] References Cited

U.S. PATENT DOCUMENTS

| | | |
|---|---|---|
| 2,009,700 | 7/1935 | McMurdo . |
| 2,345,777 | 4/1944 | Somers . |
| 3,877,797 | 4/1975 | Thornton, Jr. ........................ 351/44 |
| 4,247,177 | 1/1981 | Marks et al. ............................ 351/44 |
| 4,741,611 | 5/1988 | Burns ..................................... 351/44 |
| 4,872,749 | 10/1989 | Lummis et al. ....................... 351/44 |
| 4,911,546 | 3/1990 | Cohen .................................... 351/44 |
| 4,952,046 | 8/1990 | Stephens et al. ..................... 351/163 |
| 5,006,409 | 4/1991 | Baiocchi et al. .................... 428/411.1 |
| 5,054,902 | 10/1991 | King ...................................... 351/44 |
| 5,083,858 | 1/1992 | Girerd .................................... 351/44 |
| 5,363,152 | 11/1994 | Reed ..................................... 351/165 |

*Primary Examiner*—Scott J. Sugarman
*Attorney, Agent, or Firm*—Waddey & Patterson; Mark J. Patterson

[57] ABSTRACT

To enhance perception of a yellow tennis ball while playing or watching a tennis game, the game is viewed through an optical filter mounted between the participant or spectator and the ball. The optical filter has predetermined transmittance having a pronounced peak centered substantially around 500 to 600 nanometers that passes a high percentage of incident light reflected and fluoresced by the tennis ball, but passes a substantially lower percentage of light in the remaining portion of the visible spectrum.

4 Claims, 5 Drawing Sheets

APPARATUS FOR ENHANCING VISUAL PERCEPTION OF SELECTED OBJECTS IN RECREATIONAL AND SPORTING ACTIVITIES

FIELD OF INVENTION

The invention relates generally to optics for sports-related activities.

BACKGROUND OF THE INVENTION

The adage "keep your eyes on the ball" is a familiar refrain to those who participate in sports. Success in these activities requires a participant to be able to accurately perceive a moving object. Practice is the traditional approach to improving the ability to keep ones eye on the ball. But practice requires time and patience. Most people do not have the time or inclination to practice or talent to be overcome their natural limitations. Even well-seasoned professionals in some sports may have trouble perceiving a moving object, especially where the skills of the participants have pushed the sport to the point where the speed of the object exceeds the natural ability of the players to accurately perceive it. In sports, particularly in those where a fast moving object must be followed, a participant's further development in the sport may be slowed, and fans, referees, coaches and other observers of the sport will have more difficulty following the activity.

SUMMARY OF THE INVENTION

The invention enhances visual perception of an object used within the activities with respect to its background. The invention may be used during practice, playing and watching of the activities, and requires no special training. The invention enhances the ability of participants to visually perceive a selected object, such as a ball, and thus offers the opportunity to improve their performance.

According to the invention, a specially adapted optical filter is provided to a participant or observer of the activity and supported in a location between the observer's eyes and an activity that visually enhances a selected object used in such activities with respect to the background of the object. The selected object is provided with a surface that reflects or emits light predominantly within one or more comparatively narrow predetermined ranges of wavelengths within the visible spectrum. The optical filter is selected to pass more incident light at wavelengths substantially overlapping the wavelengths at which light either reflected, emitted or both from the object peaks in intensity. To the observer or participant, the vision of moving object is thus enhanced with respect to the background.

In accordance with a further aspect of the invention, eye wear for a participant or observer includes a lens (corrective or non-corrective) or other substantially clear, solid element that is treated with a dye or a multi-layer optical interference coating which tends to pass more light in a range substantially corresponding to the predominant color characteristic of the object than outside the range. In one preferred embodiment, a blue dye is applied to a transparent lens for enhancing viewing of an optical yellow tennis ball.

The invention is adaptable to other activities. These activities may include, for example, racquetball, squash, golf, baseball and other activities which require a moving or stationary object be contacted by the hand of an object held by the in the hand of a player. Additionally, the invention is useful for improving safety in activities such as water skiing, hunting and military training maneuvers by providing to participants clothing or other wearable objects having distinctive and predominant color characteristics and to observers eye wear of enhancing perception of such clothing or objects.

These and other aspects and advantages of the invention will be apparent in the following description of the appended drawings illustrating a preferred embodiment of the invention.

DETAILED DESCRIPTION OF THE DRAWINGS

In the following description, like numbers refer to like parts.

Figure 1:
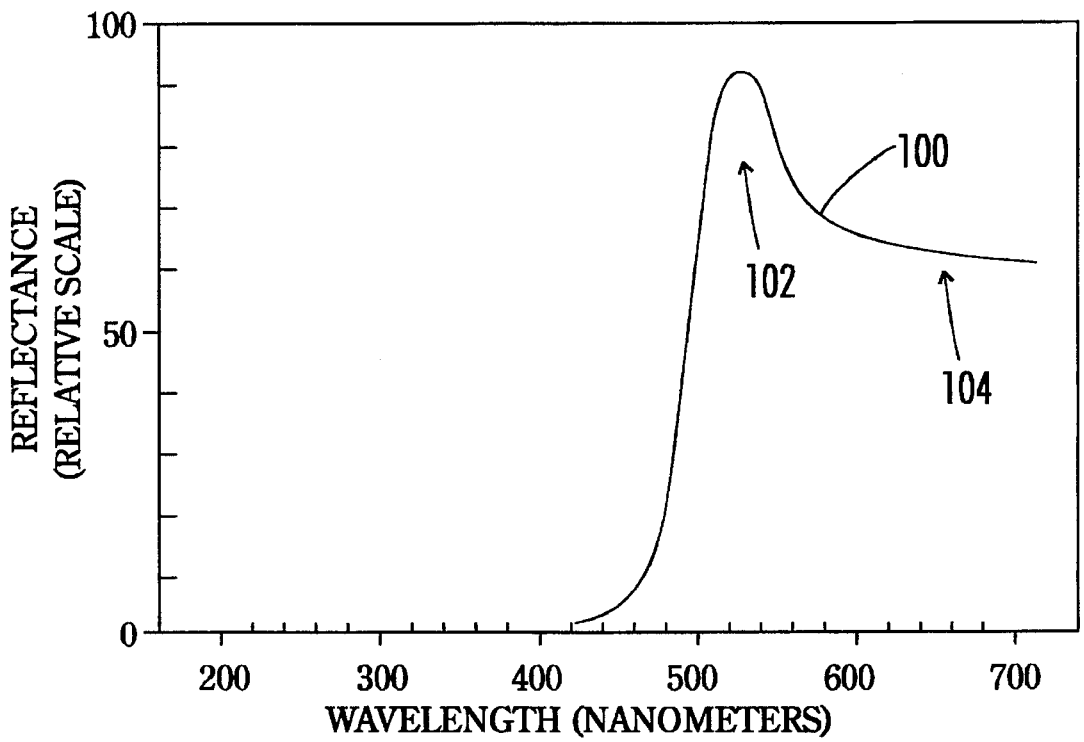
FIG. 1 is a graph showing relative reflectance of visible light from a standard, fluorescent yellow tennis ball as a function of wavelength.

Referring to FIG. 1, curve 100 illustrates relative reflectance of electromagnetic radiation within the visible spectrum from a typical fluorescent yellow tennis ball. There is a peak 102 of radiation in the green-yellow area of the visible spectrum centered approximately around 500 to 525 nanometers. A "peak", as referred to herein, is a local maximum of intensity flanked on each side of the peak by a local minimum of intensity that is substantially less than the peak intensity. The relative reflectance rolls off sharply on each side of this peak. Toward the blue side of the peak, the relative reflectance falls to near zero at approximately 450 Nanometers. However, on the red side of the peak, the reflectance curve decreases less rapidly to a substantially lower level in the range of 600 Nanometers. As used herein, the bandwidth of a peak of intensity of incident radiation or light is the range of wavelengths between half-power points on the intensity curve on either side of the peak. However, if the intensity on a side of the peak does not decrease to a level below the half-power point, then the edge of the bandwidth on that side of the peak is the 50% point between the peak and the local minima.

Figure 2:
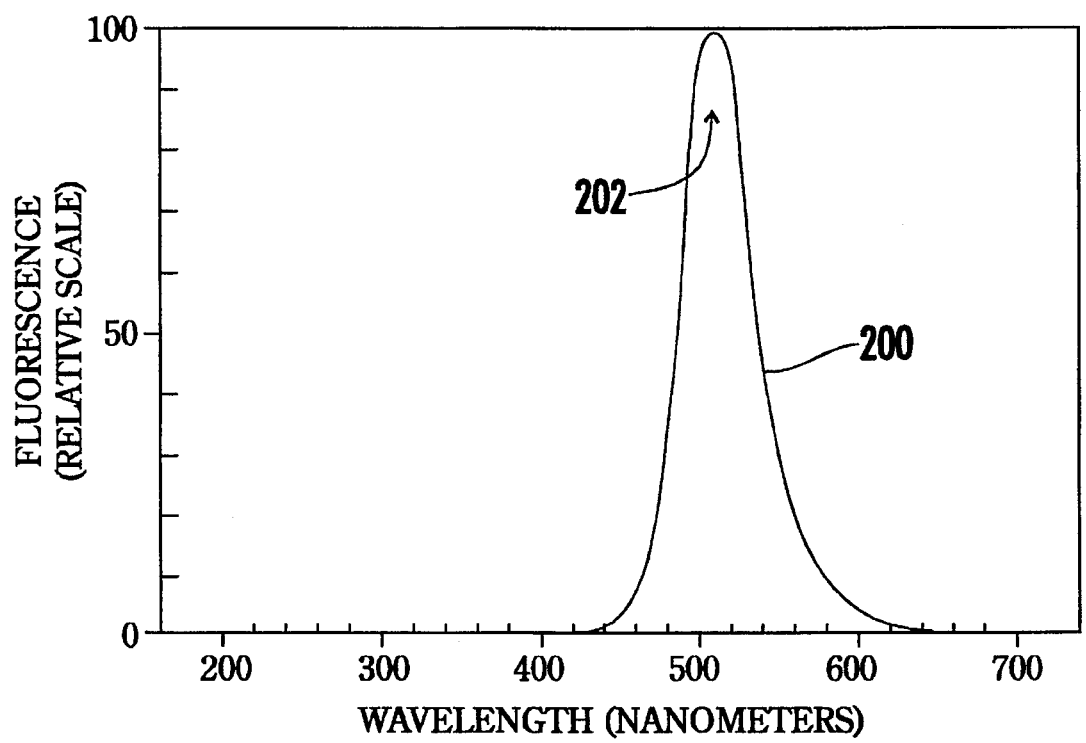
FIG. 2 is a graphs showing relative intensity of florescence at visible wavelengths from a standard, fluorescent yellow tennis ball as a function of wavelength.

Referring now to FIG. 2, in addition to reflecting visible light, the optical yellow coating on the tennis ball also emits light in the visible range through florescence. Graph 200 indicates that the florescence of a typical fluorescent yellow tennis ball has a pronounced peak 202 at around 500 to 525 nanometers that rolls off sharply on each side. The bandwidth of peak 202 substantially correlates with or overlaps the bandwidth of peak 102 (FIG. 1) for reflectance.

Figure 3:
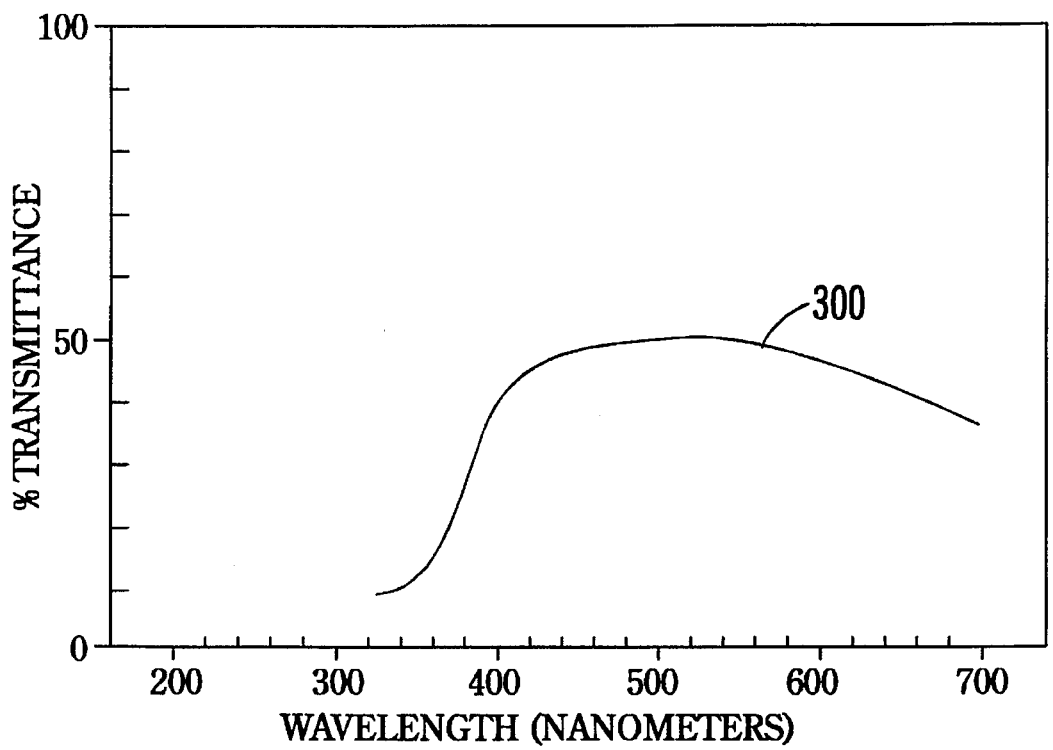
FIG. 3 is a graph of percent transmittance versus wavelength of a typical prior art sunglass lens specially treated for attenuation of ultra-violet light.

Referring now to FIG. 3, curve 300 illustrates a typical transmission characteristic for a sunglass lens treated with an optical coating on the surface of the lens that attenuates ultraviolet light. As indicated by curve 300, the transmittance (measured by the percentage of incident light transmitted through the lens) of the sunglass lens remains substantially consistent over the visible range, though it may have a tint due to imbalance in one region of the spectrum with respect to other regions. It does not, however, have pronounced peaks in any particular range.

Figure 4:
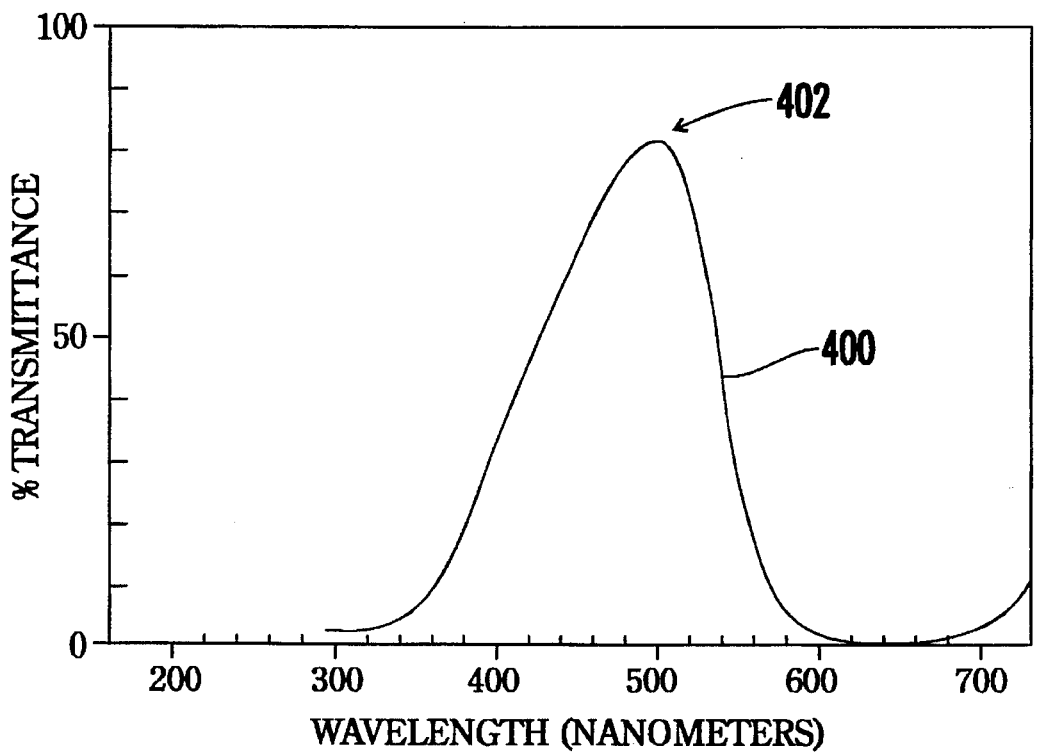
FIG. 4 is a graph showing percent transmittance at visible wavelengths of an optical filter applied to a lens in accordance with a preferred embodiment of the invention for enhancing viewing of an optical yellow tennis ball.

Referring now to FIGS. 1, 2 and 4, curve 400 is a graph that illustrates the percent of incident light as a function of wavelength transmitted by a lens having an optical filter according to the present invention. As used herein, "lens" refers to conventional eyeglass lenses that correct and that do not correct vision, and to solid, substantially transparent material, without any limitation to shape or size, that may support an optical filter interposed between an eye and an object to be viewed and through which the object is to be viewed. The transmittance of the lens has a pronounced peak of transmittance 402 that is centered substantially around 500 to 525 nanometers. On each side of the peak is a wave length at which transmittance is fifty percent of the peak transmittance. The range of wavelengths between these two fifty percent of peak transmittance points will be referred to herein as the bandwidth of the peak. The bandwidth of the peak transmittance 402 substantially correlates with or overlaps the bandwidth of the peaks 102 and 202 of light reflected and fluoresced by the optical yellow tennis ball shown in FIGS. 1 and 2. It is preferred that the bandwidths of the peaks 102 and 202 of reflectance and florescence of the tennis ball substantially overlap by at least one-half the bandwidth of the peak of transmittance 402. The transmittance of the lens rolls-off rather sharply on each side of its peak 402, approaching zero toward the limits of the visible spectrum in each direction. Consequently, the lens attenuates light not associated with the tennis ball significantly more than the intensity of the light emitted and reflected by the tennis ball. Thus, the lens will tend to enhance perception of the tennis ball against a background that reflects or emits light relatively uniformly across the visual spectrum or predominantly in parts of the visual spectrum outside the peaks of reflectance 102 and florescence 202 of the tennis ball.

In tennis, as in most other activities, it is desirable to view at least some of the background. Therefore the remainder of the visible spectrum, outside the peak 402 is not completely attenuated. Furthermore, as tennis is often played out-of-doors, in the intense sunlight, the lens attenuates to a lesser degree light within the peak range to protect the eyes of the participant or observer from the sun.

To further enhance perception of the tennis ball, the transmittance of lens, as seen in curve 400, rolls off significantly more rapidly on the red side of the curve than on the blue side of the curve and falls to near zero on the red side. Transmittance in the blue region remains greater than zero and therefore the background viewed through this filter has, in general, a bluish tint. As can be seen by portion 104 of curve 100, a yellow tennis actually reflects a significant amount of red colored light, though not with quite the intensity of light within the green-yellow region of spectrum. Reducing the transmittance in the red region of the spectrum tends to emphasize the predominant yellow-green color of the ball while removing orange and lower wavelengths associated primarily with the background, thus further enhancing perception of the tennis ball while maintaining sufficient transmittance of other parts of the visible spectrum to reasonably view the background.

One example of a suitable optical filter is a thin film, polycarbonate filter, manufactured and distributed under the name Lee Filters by Lee Panavision International, Inc., of Andover, Hampshire, England, and designated "Peacock Blue", No. HT-115. This filter fairly approximates the desired transmittance shown in FIG. 4 when applied to a neutral, substantially transparent solid support element such as a glass lens and thus provides a desired enhancement of the perception of an optical yellow tennis ball against a typical background encountered when playing tennis.

Figure 5:
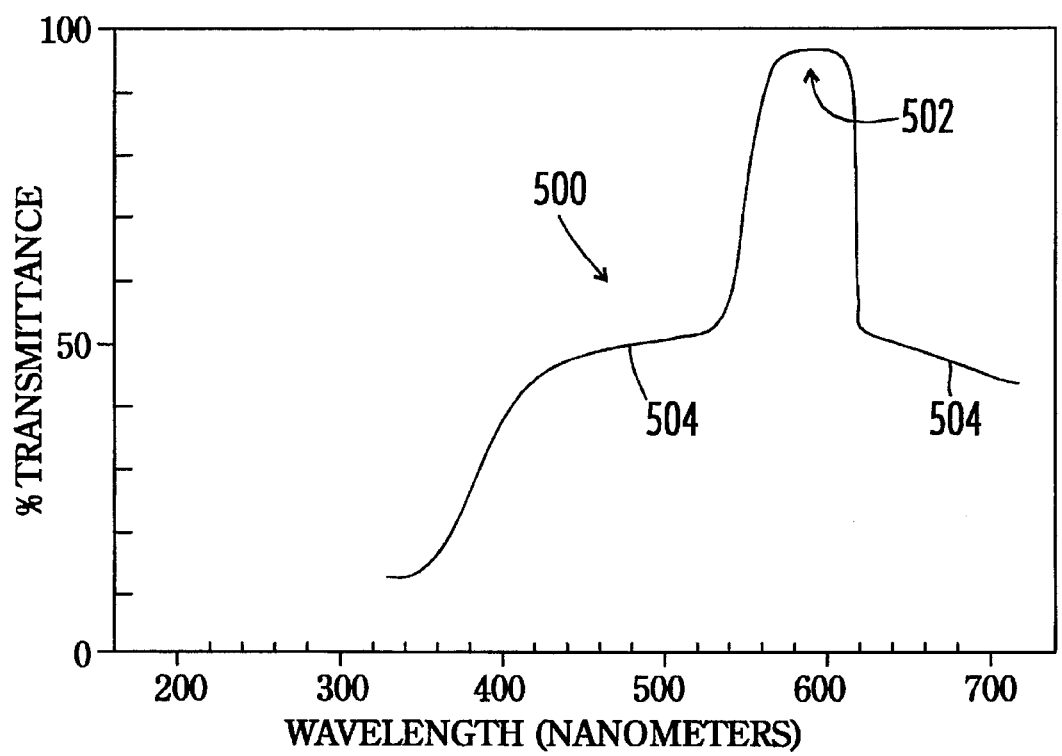
FIG. 5 is a graph showing percent transmittance at visible wavelengths through a second a lens having a second optical filter in accordance with the invention.

Referring now to FIGS. 1, 2 and 5, in another embodiment of the invention, a second transmittance for an optical filter carried by a lens is illustrated by curve 500. It has a peak 502 which is substantially correlated to peak 102 in the reflectance of the tennis ball and to peak 202 in the florescence of the tennis ball. Unlike that the transmittance curve 400 illustrated in FIG. 4, the transmittance curve 502 significantly roll-offs on each side of the peak to substantially level plateaus 504. The transmittance of the lens thus emphasizes the predominant yellow-green appearance of the ball while allowing a substantial amount of the remainder of the visible spectrum to be transmitted. The tennis ball is enhanced without significantly attenuating light reflected and emitted by the background. This transmittance characteristic is well-suited for low light conditions since it transmits significantly more of the background light for better viewing.

Figure 6:
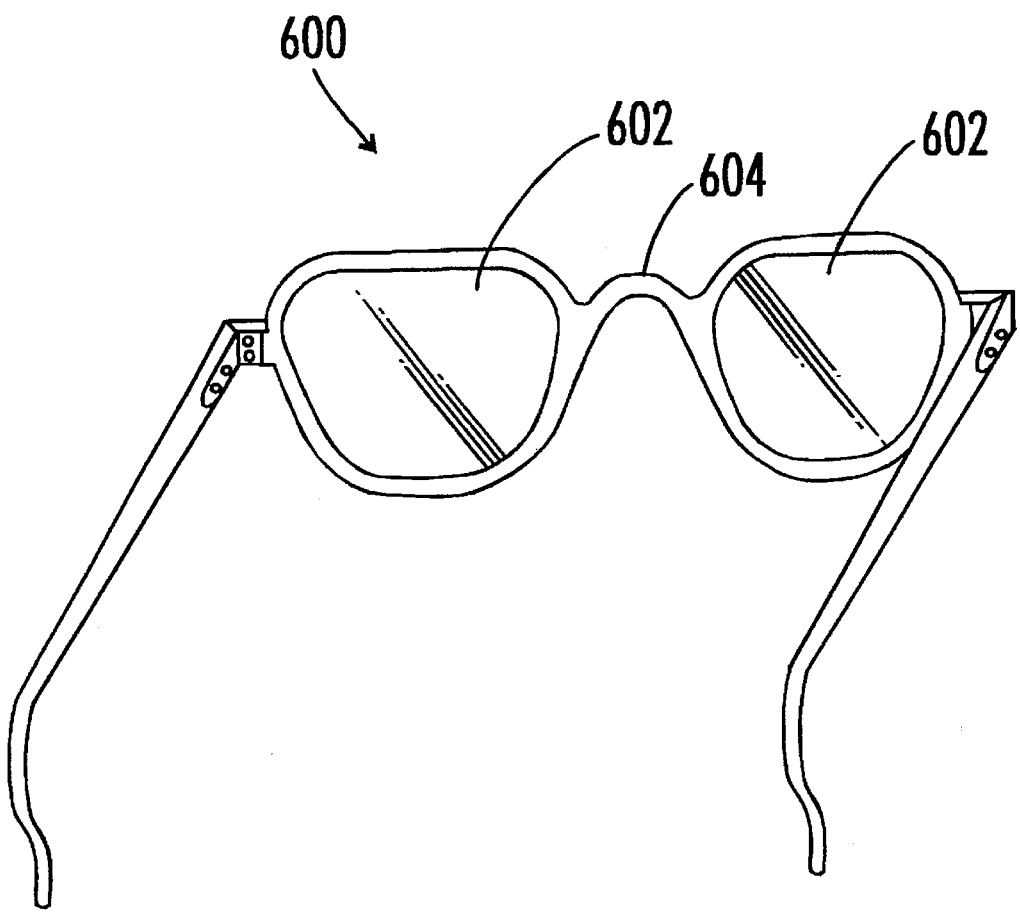
FIG. 6 illustrates standard eye wear incorporating a lens having an optical filter in accordance with the invention.

Referring to FIG. 6, eyeglasses 600 include two lenses 602 supported mounted to frame 604 to support the lens within the field of vision of a person wearing the frame. Eyeglasses are well-suited for supporting a lens in front of eyes of a participant who must move during the activity, such as a player in a tennis game. The specific design of the frame and the shape and size of the lenses is a matter of preference of the wearer. Each lens 602 is comprised of clear, neutral glass. A layer of thin plastic film is bonded to one surface of the glass lens. The thin plastic film is impregnated with a dye that has a transmittance substantially as illustrated in FIGS. 4 or 5. Alternately, the dye may also be mixed in with a plastic substrate and molded into a rigid plastic lens. Other types of optical filters may be applied to the surface of the glass. One type of well known optical falter is an optical interference coating containing several layers of anti-reflective material deposited on the surface of the glass lens. The constitution and thickness of the layers are chosen to refract and to reflect predetermined wavelengths of light in a predetermined manner to create predetermined patterns of constructive and destructive interference.

Alternately, instead of a pair of eye glasses, other forms of eyewear, for example goggles or contact lens, could be treated in a similar fashion with a dye or interference coating to give the desired transmission characteristic that enhances an object having a predetermined predominant color characteristic with regard to the background, as exemplified by FIGS. 4 and 5.

Figure 7:
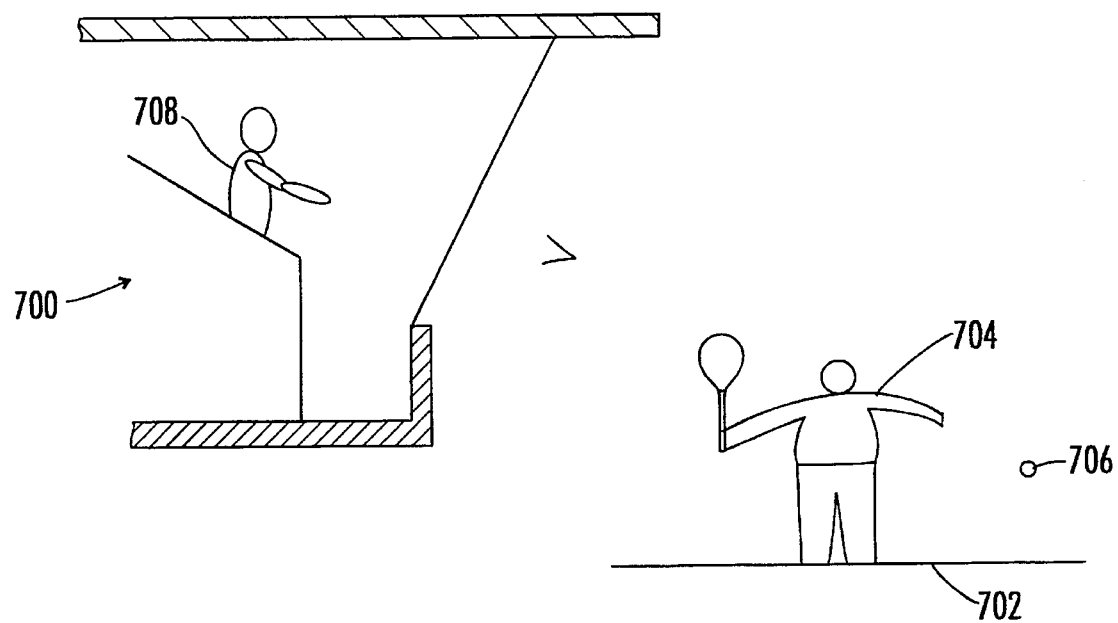
FIG. 7 is a schematic representation of a viewing stand and activity having a specially translucent surface between an observer of an activity and the area of activity that supports an optical filter for enhancing viewing of an object having a predominant color characteristic.

Referring now to FIG. 7, viewing stand 700 is located adjacent to court 702 on which player 704 is playing tennis with tennis ball 706. The stand includes a sheet of substantially transparent material, such a plate of glass or plastic, supported between viewer 708 and court 702. Included with transparent material is an optical filter having the transmittance characteristic illustrated by the graphs of FIG. 4 or 5. Observers seated in the stand thus have an enhanced view of the tennis ball. The viewing stand is adaptable for viewing other types of playing areas and the substantially transparent material adaptable to include an optical filter having a transmittance characteristic that enhances viewing of an object in the playing area having a predominant color by attenuating or reflecting colors in the visible spectrum outside of the predominant color. The foregoing description is of preferred embodiments of the invention only and intended only as examples, not limitations, of the invention. The scope of the invention is set out in the appended claims.

What is chimed is:

1. A viewing apparatus for enhancing visualization of a pre-determined target object against a background of other objects comprising:
   a. lens means for transmitting a high percentage of light to each eye of a user over a spectrum of wavelengths within a visible light spectrum, to define a filter spectrum;
   b. the lens means including optical filter means for attenuating light at wavelengths outside the filter spectrum such that the filter spectrum is broader than a target spectrum and narrower than the visible spectrum, and whereby the filter spectrum has upper and lower edges defined by wavelengths where light in the visible spectrum outside the upper and lower edges is substantially attenuated as compared to a center portion of the filter spectrum, the optical filter means having a color tint visible to the user;
   c. the target spectrum comprising a spectrum of wavelengths of light which emanate from the target object to define a true color of the object, the target spectrum corresponding to a relatively narrow portion of the visible light spectrum of wavelengths, and wherein the target spectrum is further defined by at least one target wavelength which corresponds to a point within the target spectrum of peak light intensity, with light intensity within the target spectrum both above and below the target wavelength being of decreased intensity compared to the target wavelength;
   d. the optical filter means further attenuating light such that the target wavelength is within the filter spectrum and proximate either the upper or lower edge of the filter spectrum whereby the target object is perceived by the user as having its substantially true color and background objects are perceived as having a contrasting color which is substantially the same as the color tint of the optical filter means; and
   e. support means for positioning the lens means between the user and the target object such that visual perception of the target object is enhanced concurrently in each eye of the user.

2. The viewing apparatus of claim 1 wherein the lens means comprises a first lens and a second lens which are supported in the support means proximate a corresponding left or right eye of the user.

3. The apparatus of claim 1 wherein the target object is a yellow-green tennis ball having a target wavelength which falls within a range of 510–540 nm and wherein the optical filter means provides a reduced attenuation of light at wavelengths which are shorter than the target wavelength as compared to attenuation of light having wavelengths which are longer than the target wavelength such that light at wavelengths between 400 nm and the target wavelength are substantially transmitted as compared to light at wavelengths greater than the target wavelength, whereby the user perceives the target object as yellow-green and background objects as having a bluish tint.

4. The apparatus of claim 1 wherein the lens means comprises an optical sheet of material and the support means comprises means to position the sheet between a playing area which includes the target object and a spectator viewing area which includes one or more users.

* * * * *